June 10, 1969
W. E. BELL
3,449,694
GAS LASER WITH INTERNAL ELECTRODES
Filed Sept. 9, 1964
Sheet 2 of 2
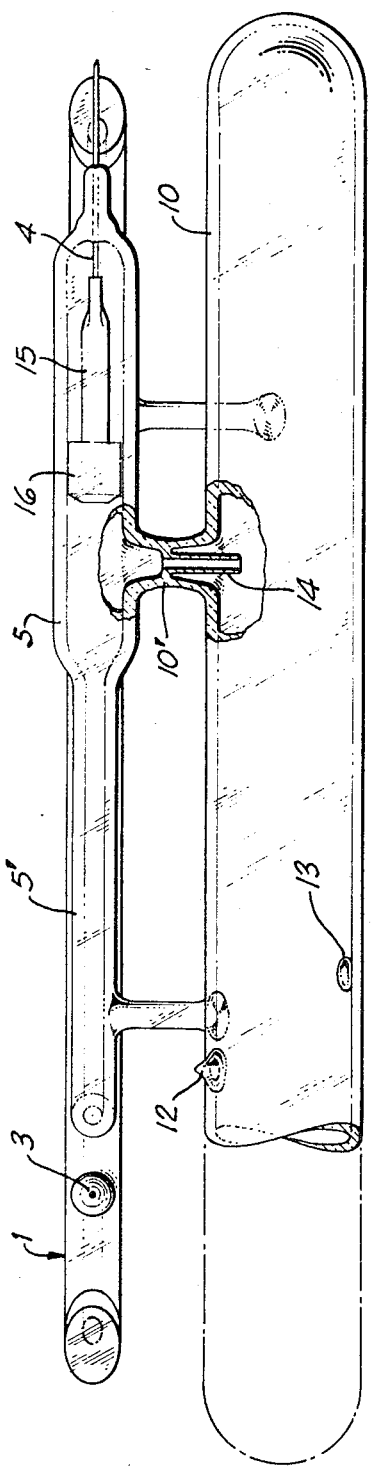
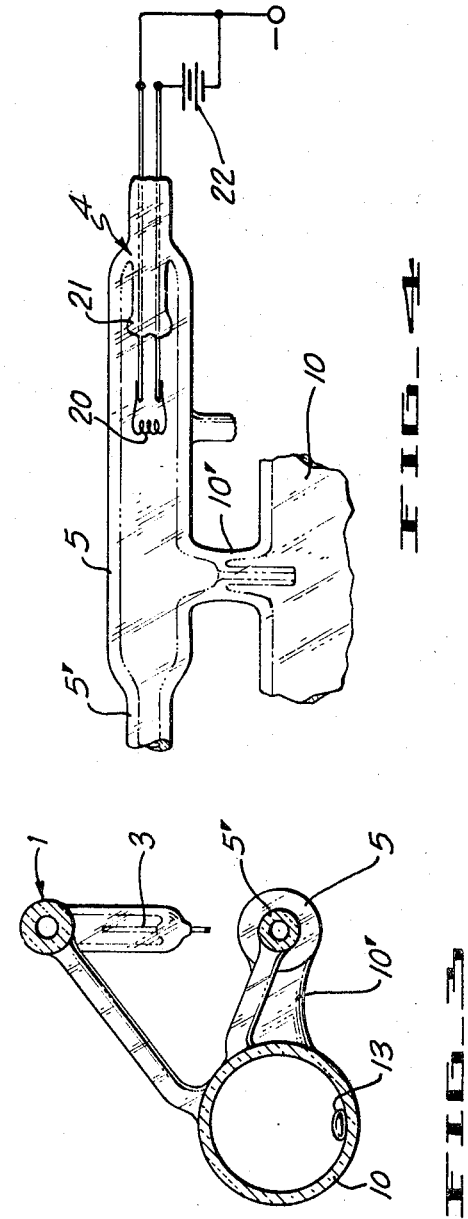
WILLIAM E. BELL
INVENTOR.
BY J. Rosenblum
ATTORNEY

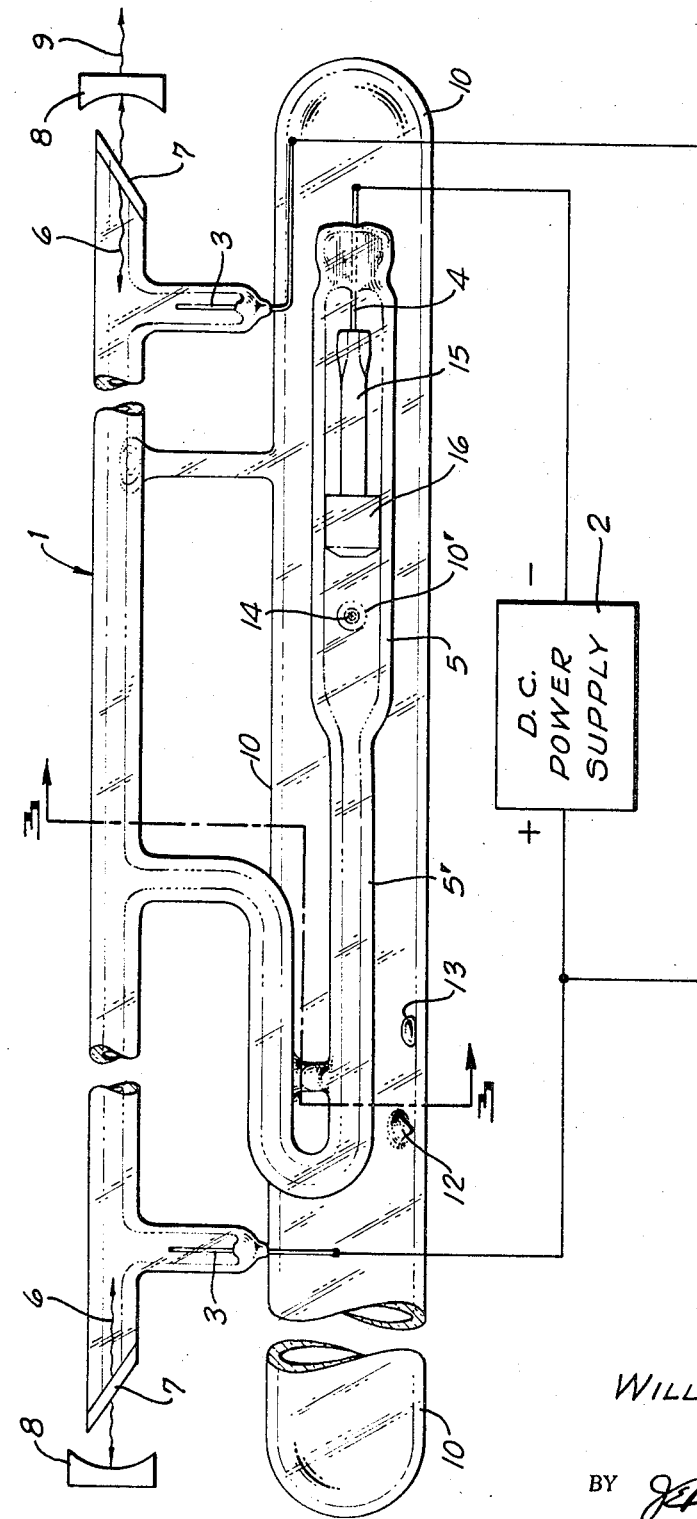

United States Patent Office 3,449,694
Patented June 10, 1969

3,449,694
GAS LASER WITH INTERNAL ELECTRODES
William E. Bell, Palo Alto, Calif., assignor to Spectra-Physics, Inc., Mountain View, Calif., a corporation of California
Filed Sept. 9, 1964, Ser. No. 395,228
Int. Cl. H01s 3/00
U.S. Cl. 331—94.5           12 Claims

ABSTRACT OF THE DISCLOSURE

An internal-electrode, D-C excited, gas laser having a second gaseous medium which is more completely ionized than the active laser medium so that the second medium becomes concentrated in the vicinity of the cathode and protects against undesirable interaction between the active medium and the cathode. In a typical example, the active medium contains a rare gas at a pressure of less than 10 torr, and the second medium is a metal vapor at a pressure of less than 1 torr generated from a reservoir appended to the laser tube in the vicinity of the cathode. The bombardment of ions from the metal vapor concentrated in the cathode region is less damaging than the ion bombardment which occurs from the rare gas active medium in the absence of the metal vapor. Moreover, the existence of the reservoir prevents significant cleanup of the metal vapor. An anode electrode is positioned adjacent each optical transmission window of the laser tube in order to prevent the deposit of metal on these windows.

---

The present invention relates to gas lasers in which electrodes are mounted internal to the gas envelope.

Often it is desirable to use internal electrodes in a gas laser, for example to improve the efficiency of exciting an electrical discharge in the active gaseous medium. However, in view of the fact that gas lasers are typically operated at low pressures on the order of a few torr (mm. of Hg) or less for optimum gain and noise characteristics, the introduction of internal electrodes can reduce the effective operating lifetime of the laser as a result of ion bombardment. In particular, the ions of the low-pressure discharge strike the cathode electrode at high velocities and cause the cathode material to sputter and clean up the active gas.

I have discovered that the operating lifetime of an internal-electrode gas laser can be increased significantly by the addition of a second gas which is more completely ionized than the active gas. Upon the application of a D-C voltage, the second gas acquires a high concentration of positive ions and migrates to the vicinity of the cathode by means of a phenomenon known as cataphoresis. The second gas thereby provides an environment for the cathode which inhibits clean-up of the active gas.

In one particularly useful arrangement, the active gas is a rare gas or a mixture of rare gases, and the second gas is a metal vapor, for example mercury vapor. The metal vapor can conveniently be evolved from a small deposit of metal placed in a reservoir appended to the cathode region of the discharge tube. Since the metal vapor has a lower ionization potential than the active gas, it is more completely ionized and concentrates in the cathode region where it serves to prevent ion bombardment of the cathode by the active gas ions. Because of the existence of the metal reservoir, the metal vapor itself is not significantly cleaned up. Also the bombardment of ions from the gaseous environment concentrated about the cathode is less damaging than ion bombardment from the active gas alone. An additional advantage is that the rare gas-metal vapor discharge does not have the large negative resistance characteristic associated with a pure rare gas discharge, thereby improving the inherent stability of the discharge circuit.

The various features and advantages of the present invention will become more apparent upon a consideration of the following specification taken in connection with the accompanying drawing, wherein:

FIGURE 1 is a partially schematic elevational view of a gas laser in accordance with the present invention;

FIGURE 2 is a fragmentary bottom view of the gas laser of FIGURE 1;

FIGURE 3 is a cross-sectional view taken along line 3—3 in FIGURE 1; and

FIGURE 4 is a partially schematic and fragmentary elevational view of a modification of the laser of FIGURE 1.

Referring to the drawing, an exemplary embodiment of the present invention has a plasma tube 1 (typically 120 cm. long with a 2.5 mm. bore) containing a rare gas active medium at low pressure, for example a mixture of 80% helium and 20% neon at a pressure of about 2 torr. An optically-radiating discharge is created in the plasma tube by the application of a D-C voltage on the order of 2000 volts (at about 20 milliamps) from power supply 2 between end anode pins 3 and cathode 4 located in a central appendage 5. Optical radiation 6 at the desired wavelength, for example 6328 A., is transmitted through vacuum-tight windows 7 and axially reflected in an optical resonator consisting of two optically-facing mirrors 8, which may be the multiple dielectric layer type with maximum reflectance at the operating wavelength. The discharge maintains a population inversion between the energy levels defining the operating wavelength so that the active gaseous-medium provides stimulated-emission gain at this wavelength. Sufficient transmission at the operating wavelength is provided in at least one of the mirrors 8 to form the output laser beam 9.

Referring now more particularly to the cathode portion of the plasma tube as best seen in FIGURE 2, a reservoir appendage 10 is attached to the cathode appendage 5 via a connecting tube 10'. After processing of the tube is complete, a small drop 13 of mercury is placed in the reservoir 10 through port 12 which is then sealed off. A passageway tube 14 having a smaller diameter on the order of 1 mm. is sealed at one end to the walls of connecting tube 11 with the other end projecting into the reservoir 10 in order to prevent the mercury drop 13 from entering the cathode appendage 5. The mercury vapor from the drop 13, however, readily passes through the tube 14 to establish a mercury vapor pressure in the cathode appendage 5 at a pressure determined by the temperature of the reservoir. Under typical operating conditions, the reservoir has a temperature of 20–30° C. and the mercury vapor pressure is about $10^{-3}$ torr. Due to the cataphoresis effect, the mercury vapor is contained in the cathode appendage 5 and an abrupt transition between the bluish glow of the mercury discharge in the appendage 5 and the reddish-orange glow of the helium-neon in the remainder of the tube 1 can be seen at the attachment of the appendage 5 to the narrow connecting tube 5'.

The electrodes are advantageously arranged with the anodes 3 in the vicinity of the windows 7 so as to protect the windows from transmission-degrading deposits of metal.

The cathode used in the embodiment of FIGURE 1 is of the cold-cathode type in which electron emission is obtained from the inside of a metallic tube 15. An enlarged ceramic shield 16 carried at the end of tube 15 prevents the discharge from reaching the outside of the tube 15 thereby further inhibiting cathode sputtering.

FIGURE 4 shows a modification using a hot cathode 4 in which electrons are thermionically emitted by filament 20 which is supported by glass bead 21 and supplied with heating current from low voltage source 22.

It is to be noted that various combinations of active gases (including various rare gases) and secondary gases (including various metal vapors) may be used in accordance with the present invention. For example, the active gas may be argon which gives high-gain laser operation from various visible wavelengths in the singly-ionized argon II spectrum.

I claim:

1. In a gas laser, the combination comprising: a gas envelope; an active gaseous medium at a pressure of less than 10 torr within said envelope; at least one electrode disposed within said envelope, said electrode having a D-C potential which attracts positive ions from said gaseous medium at a pressure of less than 1 torr; and a second gaseous medium within envelope, said second gaseous medium being more completely ionized than said active medium whereby said second medium becomes concentrated in the vicinity of said electrode and protects against undesirable interaction between said active gaseous medium and said electrode.

2. A gas laser comprising: a gas envelope; an active gaseous medium at a pressure of less than 10 torr within said envelope; at least one cathode and at least one anode disposed within said envelope; means applying a D-C voltage between said cathode and said anode for creating a discharge in said active gaseous medium which provides stimulated-emission gain for optical radiation; and a second gaseous medium at a pressure of less than 1 torr within said envelope, said second gaseous medium being more completely ionized than said active medium whereby said second medium becomes concentrated in the vicinity of said cathode and protects against undesirable interaction between said active gaseous medium and said cathode.

3. A gas laser according to claim 2 further including an optical resonator for repeatedly reflecting said optical radiation through said active medium.

4. A gas laser according to claim 1 wherein said second gaseous medium has a lower ionization potential than said active gaseous medium.

5. A gas laser according to claim 2 wherein said active gaseous medium includes at least one rare gas.

6. A gas laser according to claim 2 wherein said second gaseous medium is a metal vapor.

7. A gas laser according to claim 6 further including a reservoir appended to said gas envelope in the vicinity of said cathode, said reservoir containing a deposit of metal from which said metal vapor is evolved.

8. A gas laser according to claim 7 including means for providing a narrow passageway between said reservoir and said cathode vicinity, said passageway re-entrantly projecting into said reservoir and serving to prevent said metal deposit from entering said cathode vicinity.

9. A gas laser according to claim 6 wherein said gas envelope has at least one window through which said optical radiation is transmitted, and each of said windows has an anode positioned adjacent thereto in order to prevent the deposit of metal on said windows.

10. A gas laser according to claim 2 wherein said cathode is a cold cathode comprising a metallic tube, and a shield surrounding said tube for preventing the discharge from reaching the outside of said tube.

11. A gas laser according to claim 2 wherein said cathode is a hot cathode comprising a filament, and means for heating said filament to cause thermionic emission of said filament.

12. A gas laser according to claim 3 wherein said optical resonator transmits a portion of said optical radiation in order to provide an external output of said radiation.

References Cited

UNITED STATES PATENTS

| | | | |
|---|---|---|---|
| 2,673,944 | 3/1954 | Francis | 313—225 |
| 3,242,439 | 3/1966 | Rigden et al. | 331—94.5 |
| 3,317,778 | 5/1967 | Timmermans et al. | 313—225 |
| 3,321,714 | 5/1967 | Tien | 331—94.5 |

RONALD L. WIBERT, *Primary Examiner.*

W. L. SIKES, *Assistant Examiner.*